(12) United States Patent
Kao

(10) Patent No.: US 12,232,500 B2
(45) Date of Patent: Feb. 25, 2025

(54) ROLLED STUFFING FOOD FORMING APPARATUS AND METHOD THEREOF

(71) Applicant: ANKO FOOD MACHINE CO., LTD., New Taipei (TW)

(72) Inventor: Kai-Po Kao, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 305 days.

(21) Appl. No.: 17/878,935

(22) Filed: Aug. 2, 2022

(65) Prior Publication Data

US 2023/0371528 A1 Nov. 23, 2023

(30) Foreign Application Priority Data

May 19, 2022 (TW) .................................. 111118719

(51) Int. Cl.
*A21C 9/06* (2006.01)
*A23P 20/20* (2016.01)

(52) U.S. Cl.
CPC .............. *A21C 9/063* (2013.01); *A23P 20/20* (2016.08)

(58) Field of Classification Search
CPC ............ A21C 9/063; A21C 9/08; A23P 20/20
USPC ................................................ 99/450.1, 450.6
See application file for complete search history.

(56) References Cited

U.S. PATENT DOCUMENTS

| | | | | |
|---|---|---|---|---|
| 3,912,433 A * | 10/1975 | Ma | ........................... | A23P 20/20 99/450.6 |
| 4,388,059 A * | 6/1983 | Ma | ........................ | A21C 9/063 425/117 |
| 4,439,124 A * | 3/1984 | Watanabe | .............. | A21C 9/063 425/383 |
| 4,691,627 A * | 9/1987 | Roberts | .................. | A21C 9/063 99/450.2 |
| 6,802,248 B1 * | 10/2004 | Chiang | .................. | A21C 9/063 99/450.2 |
| 8,353,742 B1 * | 1/2013 | Choi | ........................ | A21C 9/063 452/32 |
| 8,672,664 B2 * | 3/2014 | Uchida | ................. | A23G 3/0278 425/315 |
| 2012/0152130 A1 * | 6/2012 | Robert | ................... | A21C 9/063 99/450.7 |
| 2021/0329961 A1 * | 10/2021 | Itou | ......................... | A23P 20/20 |
| 2021/0345624 A1 * | 11/2021 | Itou | ........................ | A21C 9/088 |

* cited by examiner

*Primary Examiner* — Eric S Stapleton
*Assistant Examiner* — Yeong Juen Thong
(74) *Attorney, Agent, or Firm* — Rivka Friedman

(57) ABSTRACT

The present utility invention provides a rolled stuffing food forming apparatus, which uses a stuffing-filling unit in cooperation with an U shape forming assembly to simulate the manual work preferably, then, in the conventional art, the technical issues which are occurred in the automatic equipments when simulating the manual work are solved.

4 Claims, 7 Drawing Sheets

ROLLED STUFFING FOOD FORMING APPARATUS AND METHOD THEREOF

FIELD OF THE INVENTION

The present invention relates to a rolled stuffing food forming apparatus and a method thereof, and more particularly to a food processing machinery to solve the technical problem that the machinery cannot simulate manual work to the rolled stuffing food.

BACKGROUND OF THE INVENTION

In fact, the main purpose of the rolled stuffing food forming apparatus in the prior art is to simulate manual work. For instance, the order of the manual work for rolled stuffing food (such as spring rolls . . . ) is: first, preparing a wrapper; then, putting a stuffing on the wrapper; then, cover the stuffing with one corner of the wrapper to the other corner of the diagonal; then, wrapping the two corners of the sides to the center; then, rolling the wrapped stuffing to the other corner and dipping the other corner with water; finally, forming the rolled stuffing food with the other corner dipped with water.

However, in order to simplify the machinery, each step is often implemented, separately. While implementing steps, separately, some technical problems arise. Thus, additional procedures need to be implemented. Although machine automation has greatly increased speed, the additional procedures still increase work time and the chance of problems.

For instance, during manual work, the stuffing is put on the wrapper, because it is made at a fixed point, it will not be inaccurate due to movement. Then, after the stuffing is shaped with both hands, it can maintain a specific shape without loosening. At the same time, a corner of the wrapper is wrapped over the stuffing (Generally, the hand will touch the inner or outer side of the wrapper to apply a certain force in order to maintain the shape of the stuffing during the wrapping step). After further fixing the shape of the stuffing, then the problems that may occur in subsequent operations can be greatly reduced because the wrapper has fixed the shape of the stuffing to a certain extent.

However, in the machinery in the prior art, the stuffing is not shaped after being placed on the wrapper, and the next step is proceeded. Therefore, there is one procedure to make the stuffing into a specific shape (usually a long strip), and then one corner of the wrapper is moved toward the other corner of the diagonal. Nevertheless, the shape of the stuffing may possibly be deformed during this moving step.

Thus, there is a need to provide a rolled stuffing food forming apparatus and a method thereof to solve the foregoing technical issue of the prior art.

SUMMARY OF INVENTION

For solving the problems of aforesaid prior art, the present invention uses a stuffing-filling unit in cooperation with an U shape forming assembly to simulate the manual work preferably, then, in the conventional art, the technical issues which are occurred in the automatic equipments when simulating the manual work are solved.

An objective of the present invention is to provide a rolled stuffing food forming apparatus, comprising a stuffing-filling unit, an U shape forming assembly and a preliminary wrapping unit. The stuffing-filling unit is employed to fill a stuffing on an edible wrapping sheet, wherein the edible wrapping sheet comprises a first corner and a second corner located on a first diagonal and a third corner and a fourth corner located on a second diagonal. The U shape forming assembly is arranged under the stuffing-filling unit and comprises a forming opening, employed to allow the stuffing-filling unit to pass through when descending and filling the stuffing, so that the edible wrapping sheet is subjected to the U shape forming assembly and the stuffing to appear an U shape and the stuffing is at a bottom of the U shape. The preliminary wrapping unit is employed to cooperate with the U shape forming assembly to fold the first corner toward the second corner when the edible wrapping sheet is in an U shape state, to wrap the stuffing inside the edible wrapping sheet to form a pre-rolled stuffing food.

In a preferred embodiment, the U shape forming assembly comprises a guiding assembly and a carrier. The guiding assembly comprises two guiding pieces with the forming opening inbetween. The carrier is employed to carry the pre-rolled stuffing food to move toward the first corner after the stuffing-filling unit presses down and fills the stuffing in the edible wrapping sheet.

In a preferred embodiment, the preliminary wrapping unit is a folding plate, which is arranged at a certain height above the carrier, and is moved toward the second corner to contact and fold the edible wrapping sheet from the first corner to the second corner.

In a preferred embodiment, the carrier further comprises at least one extruding piece and at least one positioning piece. The at least one extruding piece is arranged on the carrier and a position thereof is the other side of the preliminary wrapping unit relative to the forming opening. The at least one positioning piece is arranged on the carrier and a position thereof is the other side of the at least one extruding piece relative to the forming opening.

In a preferred embodiment, the rolled stuffing food forming apparatus further comprises a side wrapping assembly, employed to wrap the third corner and the fourth corner of the edible wrapping sheet toward the first diagonal.

In a preferred embodiment, the rolled stuffing food forming apparatus further comprises a pre-rolling assembly, employed to hold the edible wrapping sheet for rotation.

In order to solve the problem of the aforesaid prior art, another objective of the present invention further provides a rolled stuffing food forming method, comprising: first, employing a stuffing-filling unit to fill a stuffing on an edible wrapping sheet, wherein the edible wrapping sheet comprises a first corner and a second corner located on a first diagonal and a third corner and a fourth corner located on a second diagonal; then, employing a forming opening of an U shape forming assembly, arranged under the stuffing-filling unit, to allow the stuffing-filling unit to pass through when descending and filling the stuffing, so that the edible wrapping sheet is subjected to the U shape forming assembly and the stuffing to appear an U shape and the stuffing is at a bottom of the U shape; and then, employing a preliminary wrapping unit to cooperate with the U shape forming assembly to fold the first corner toward the second corner when the edible wrapping sheet is in an U shape state, to wrap the stuffing inside the edible wrapping sheet to form a pre-rolled stuffing food.

In a preferred embodiment, the preliminary wrapping unit, which is arranged at a certain height above the carrier, is moved toward the second corner to contact and fold the edible wrapping sheet from the first corner to the second corner.

In a preferred embodiment, the forming method further comprises: employing a side wrapping assembly to wrap the third corner and the fourth corner of the edible wrapping sheet toward the first diagonal.

In a preferred embodiment, the forming method further comprises: employing a pre-rolling assembly to hold the edible wrapping sheet for rotation.

Compared with the prior art, the present invention uses a stuffing-filling unit in cooperation with an U shape forming assembly to simulate the manual work preferably, then, in the conventional art, the technical issues which are occurred in the automatic equipments when simulating the manual work are solved.

BRIEF DESCRIPTION OF THE ACCOMPANYING DRAWINGS

DETAILED DESCRIPTION OF PREFERRED EMBODIMENTS

The following descriptions of the embodiments refer to the appended figures to illustrate specific embodiments in which the present invention may be implemented. The directional terms of up, down, front, rear, left, right, interior, exterior, side, etcetera mentioned in the present invention are merely directions of referring to appended figures. Therefore, the aforesaid directional terms are employed for explaining and understanding the present invention, but the present invention is not limited thereto.

Figure 1:
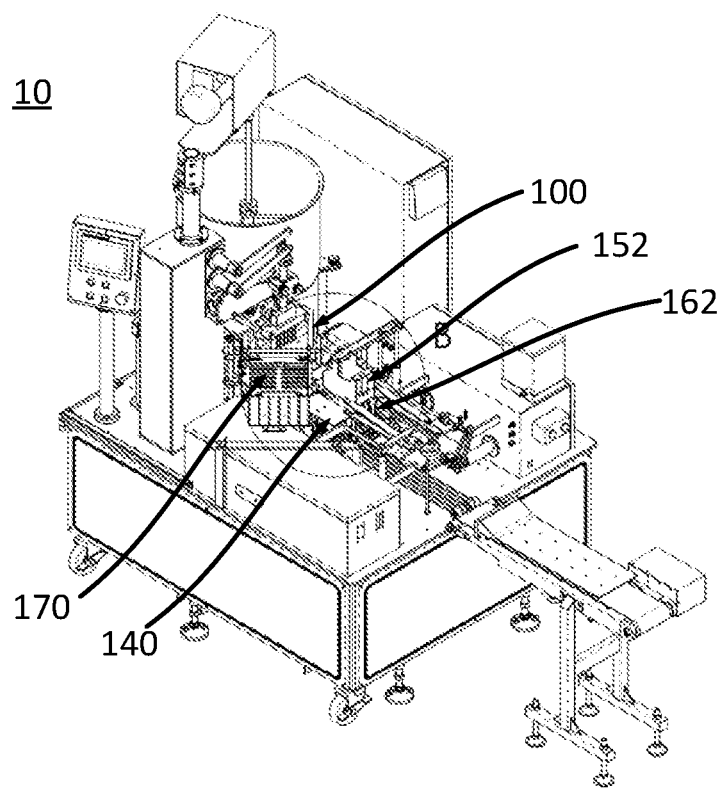
FIG. 1 shows a diagram of a rolled stuffing food forming system according to the present invention.
Figure 2:
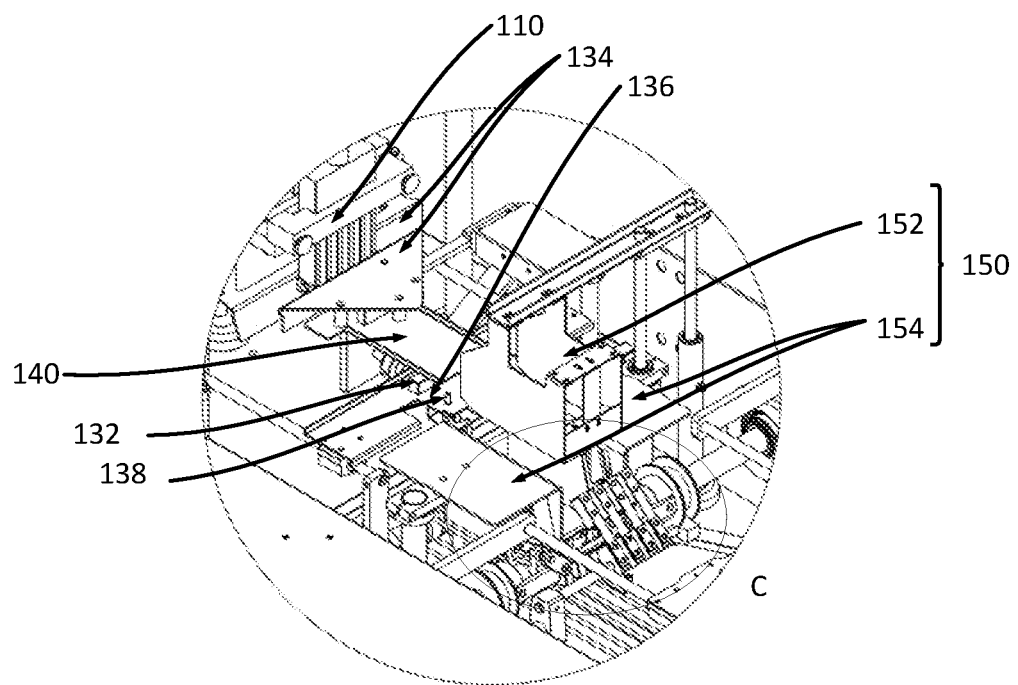
FIG. 2 depicts an enlarged view diagram of area B according to FIG. 1.
Figure 3:
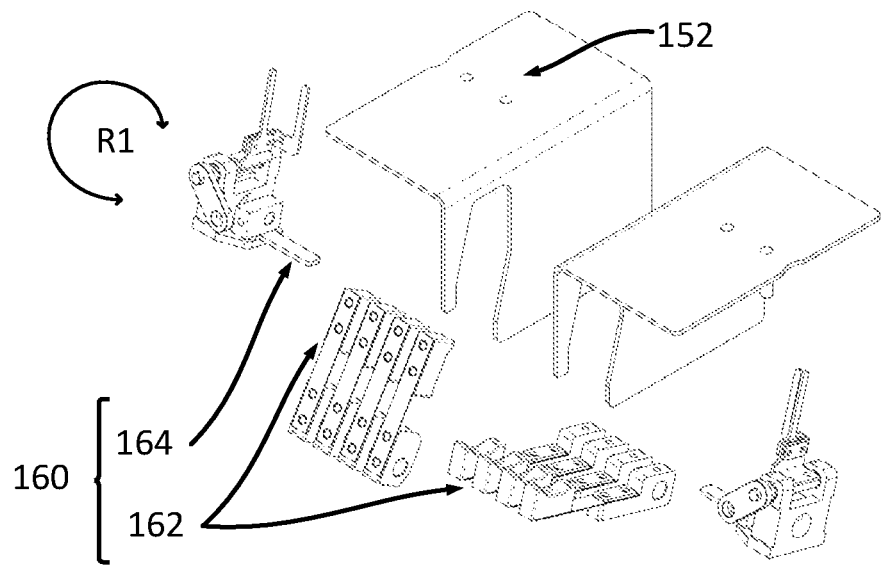
FIG. 3 depicts an enlarged view diagram of area C according to FIG. 2.
Figure 4:
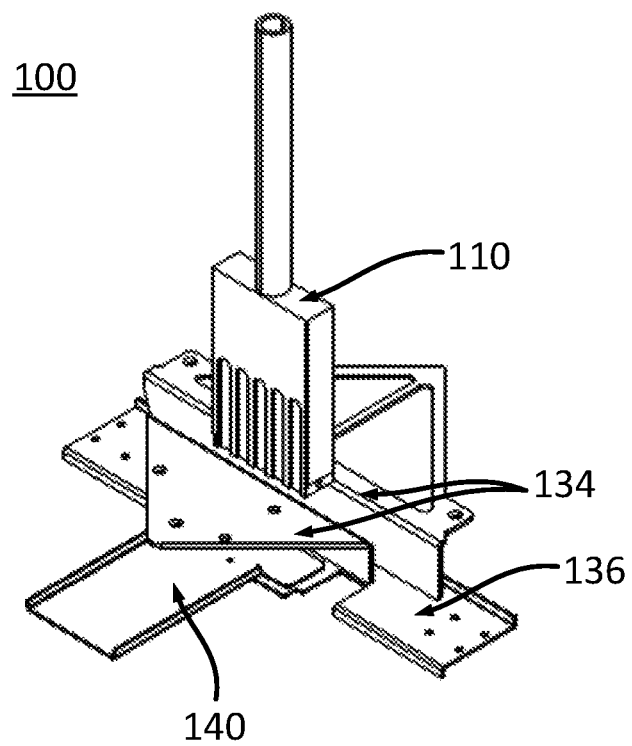
FIG. 4 depicts an exploded perspective diagram of a rolled stuffing food forming apparatus of the present invention according to FIG. 1.
Figure 6A:
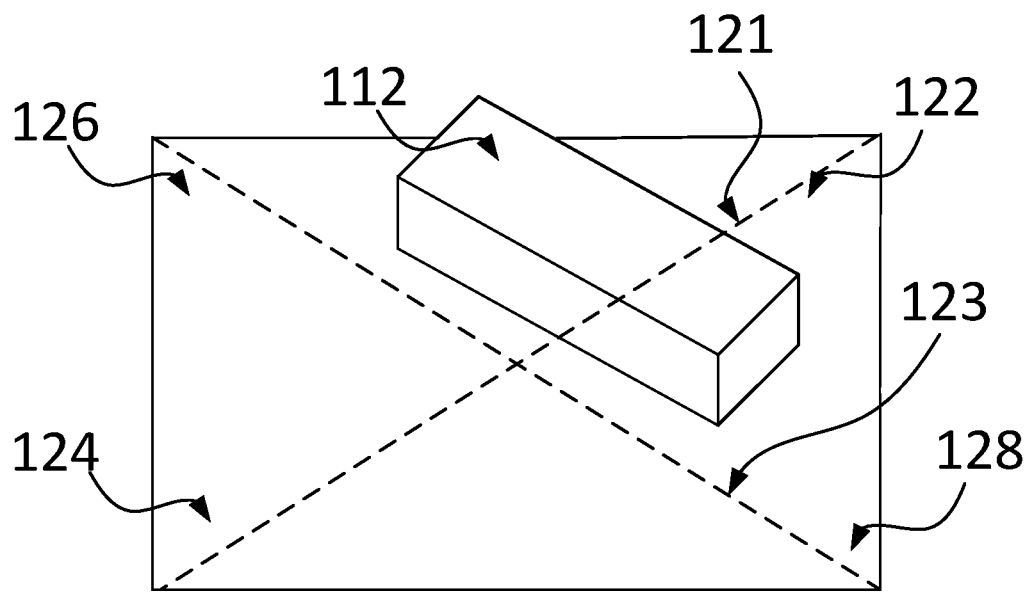
FIGS. 6A-6C are corresponding status diagrams of the rolled stuffing food according to FIGS. 5A-5E.

Please refer to FIG. 1 to FIG. 4 and FIG. 6A. FIG. 1 shows a diagram of a rolled stuffing food forming system 10 according to the present invention; FIG. 2 depicts an enlarged view diagram of area B according to FIG. 1; FIG. 3 depicts an enlarged view diagram of area C according to FIG. 2; FIG. 4 depicts an exploded perspective diagram of a rolled stuffing food forming apparatus 100 of the present invention according to FIG. 1; FIG. 6A depicts a corresponding status diagram of the rolled stuffing food.

The rolled stuffing food forming system 10 comprises: an input unit of an edible wrapping sheet, a stuffing bucket, a rolled stuffing food forming apparatus 100 (comprising a stuffing-filling unit 110, an U shape forming assembly 130, a preliminary wrapping unit 140, a side wrapping assembly 150 and a pre-rolling assembly 160), a spraying unit and a final rolling unit.

Specifically, the input unit of an edible wrapping sheet, the stuffing bucket, the spraying unit and the final rolling unit are not within the scope of the rolled stuffing food forming apparatus 100 that this invention intends to protect.

The stuffing-filling unit 110 is employed to fill a stuffing 112 on an edible wrapping sheet 120. Preferably, in the preferred embodiment, a quadrilateral edible wrapping sheet 120 is illustrated. In the following description, spring rolls will be employed for the description but it is not limited to this, As long as the stuffing food is formed by rolling, it is within the scope of this invention. The edible wrapping sheet 120 comprises a first corner 122 and a second corner 124 located on a first diagonal 121 and a third corner 126 and a fourth corner 128 located on a second diagonal 123. The U shape forming assembly 130 is arranged under the stuffing-filling unit 110 and comprises a forming opening 135, employed to allow the stuffing-filling unit 110 to pass through when descending and filling the stuffing 112, so that the edible wrapping sheet 120 is subjected to the U shape forming assembly 130 and the stuffing 112 to appear an U shape (referring to FIG. 5B) and the stuffing 112 is at a bottom of the U shape. The preliminary wrapping unit 140 is employed to cooperate with the U shape forming assembly 130 to fold the first corner 122 toward the second corner 124 when the edible wrapping sheet 120 is in an U shape state, to wrap the stuffing 112 inside the edible wrapping sheet 120 to form a pre-rolled stuffing food 129. The pre-rolled stuffing food 129 here is referred as the state of FIG. 6B. Because this is the easiest step to deform the stuffing 112 by force, the mutual cooperation of the stuffing-filling unit 110, the U shape forming assembly 130 and the preliminary wrapping unit 140 of the present invention are utilized to simulate manual work to the greatest extent.

In detail, the U shape forming assembly 130 comprises a guiding assembly 134 and a carrier 136. The guiding assembly 134 comprises two guiding pieces with the forming opening 135 inbetween. In detail, the two guiding pieces are two L-shape plates. The carrier 136 is employed to carry the pre-rolled stuffing food 129 to move toward the first corner 122 after the stuffing-filling unit 110 presses down and fills the stuffing 112 in the edible wrapping sheet 120. Please refer to FIGS. 5A-5E and FIGS. 6A-6C for details of the operation.

Furthermore, the carrier 136 further comprises at least one extruding piece 132 and at least one positioning piece 138. The at least one extruding piece 132 is arranged on the carrier 136 and a position thereof is the other side of the preliminary wrapping unit 140 relative to the forming opening 135. The at least one positioning piece 138 is arranged on the carrier 136 and a position thereof is the other side of the at least one extruding piece 132 relative to the forming opening 135.

In detail, the at least one extruding piece 132 is basically a small bump, and the height thereof is smaller than the height of the pre-rolled stuffing food 129. When the preliminary wrapping unit 140 contacts the first corner 122 and is moved toward the second corner 124, by means of the at least one extruding piece 132 below, the edible wrapping sheet 120 can be prevented from slipping and corresponding problems, thereby ensuring the shape of the pre-rolled stuffing food 129.

Figure 5A:
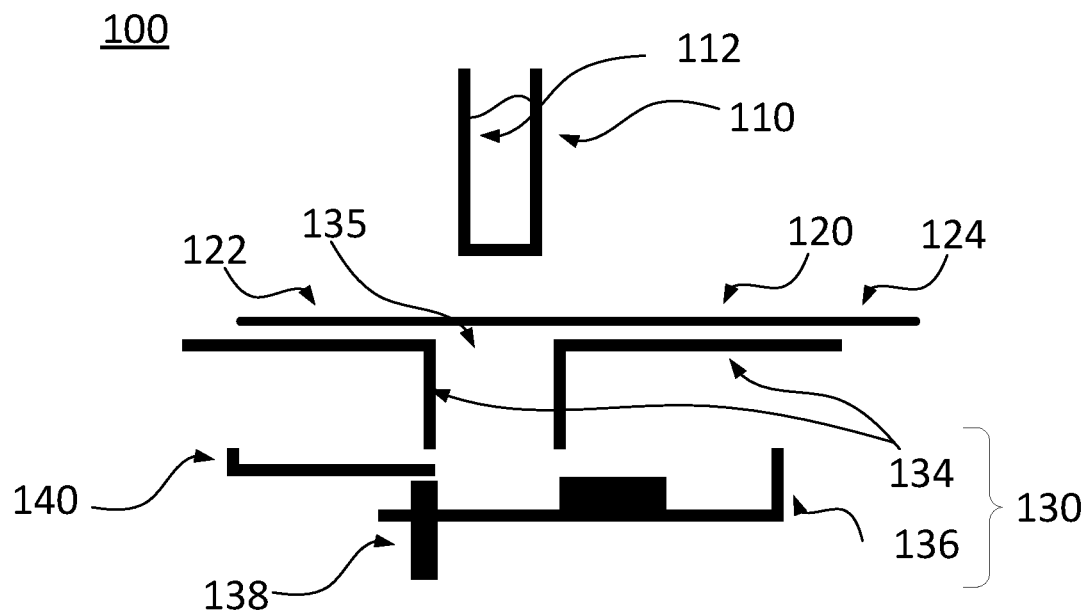
FIGS. 5A-5E are diagrams illustrating operations of the rolled stuffing food forming apparatus according to the present invention.

In detail, the at least one positioning piece 138 can extend/retract the plane of the carrier 136, and the main function thereof is to prevent the pre-rolled stuffing food 129 from moving to an incorrect position when the carrier transports the pre-rolled stuffing food 129 to the second corner 124. In the state of FIG. 5A, the at least one positioning piece 138 is in a extending state. Then, when the pre-rolled stuffing food 129 is moved to the side wrapping assembly 150, the at least one positioning piece 138 will retract to avoid puncturing the pre-rolled stuffing food 129.

Preferably, the distance between the at least one extruding piece 132 and the at least one positioning piece 138 is the width of the pre-rolled stuffing food 129 on the first diagonal line 121.

In detail, the preliminary wrapping unit 140 is a folding plate arranged at a certain height (not shown) above the carrier 136, and is moved toward the second corner 124 to contact and fold the edible wrapping sheet 120 from the first corner 122 to the second corner 124.

In the preferred embodiment, the preliminary wrapping unit 140 is a flat plate-like element that reciprocates horizontally. The certain height is the thickness of the pre-rolled stuffing food 129 in the vertical direction (the movement direction of the preliminary wrapping unit 140 is the horizontal direction). Specifically, the final product still needs to be covered by the third corner 126 and the fourth corner 128 and needs to be rolled many times, the thickness will increase.

The side wrapping assembly 150 is employed to wrap the third corner 126 and the fourth corner 128 of the edible wrapping sheet 120 toward the first diagonal 121. Here, the edible wrapping sheet 120 basically means the pre-rolled stuffing food 129. In detail, the side wrapping assembly 150 comprises one down pressing piece 152 and a pair of L shape guiding pieces 154 (the shape is the same as the guiding assembly 134). The distance of the pair of the L shape guiding pieces 154 is the distance of the pre-rolled stuffing food 129 on the second diagonal 123.

The pre-rolling assembly 160 comprises a pair of holding units 162 and a pair of rotators 164. The pair of rotators 164 are placed into the bottom of the pre-rolled stuffing food 129 while the pair of holding units 162 confine the pre-rolled stuffing food 129 from both sides in a space (usually cylindrical) therebetween. Then, the pair of rotators 164 rotates in a rotating direction R1, so that the pre-rolled stuffing food 129 can be rolled.

Specifically, it is also possible to change the direction of the rotating direction R1 according to different situations. Preferably, a small part of the second corner 124 will be left unrolled, so that the subsequent spraying unit can spray water and the final rolling unit can complete the production of spring roll.

Please refer to FIGS. 5A-5E and FIGS. 6A-6C. Please refer to FIG. 1 to FIG. 4 for component symbols mentioned below, and will not be repeated here.

First, in FIG. 5A, the edible wrapping sheet 120 is moved on the U shape forming assembly 130.

Figure 5B:
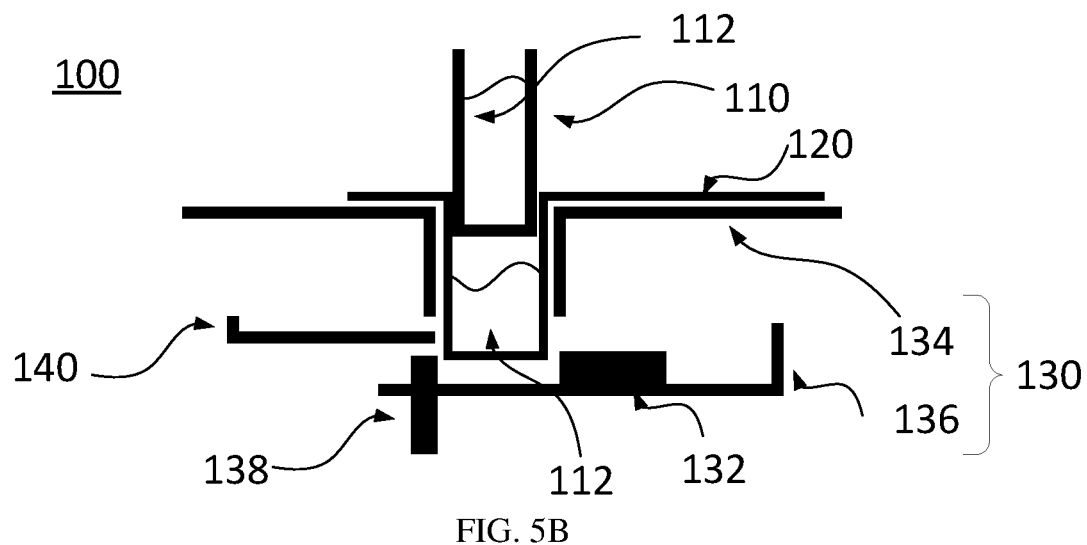

Then, as shown in FIG. 5B, the stuffing-filling unit 110 starts to move toward the forming opening 135 while filling the stuffing 112 on the edible wrapping sheet 120. Please note that the edible wrapping sheet 120 is formed as an U shape by the joint action of the U shape forming assembly 130, the stuffing-filling unit 110 and the stuffing. Similar to hand-wrapping the spring roll, when a handful of stuffings are placed on the spring roll skin, and then both hands shape the stuffings so that the stuffings will not spread out of the predetermined position. The formed U shape at least possesses several functions: 1. avoiding the stuffing spread out; 2. shaping the stuffing while filling the stuffing; 3. avoid deformation of the stuffing when wrapping the stuffing with the side (the stuffing is in the concave part). One of the main purposes of the present invention is to make the edible wrapping sheet 120 appear in a state, which is close to the shape of the stuffing wrapped by both hands and being positioned.

Figure 5C:
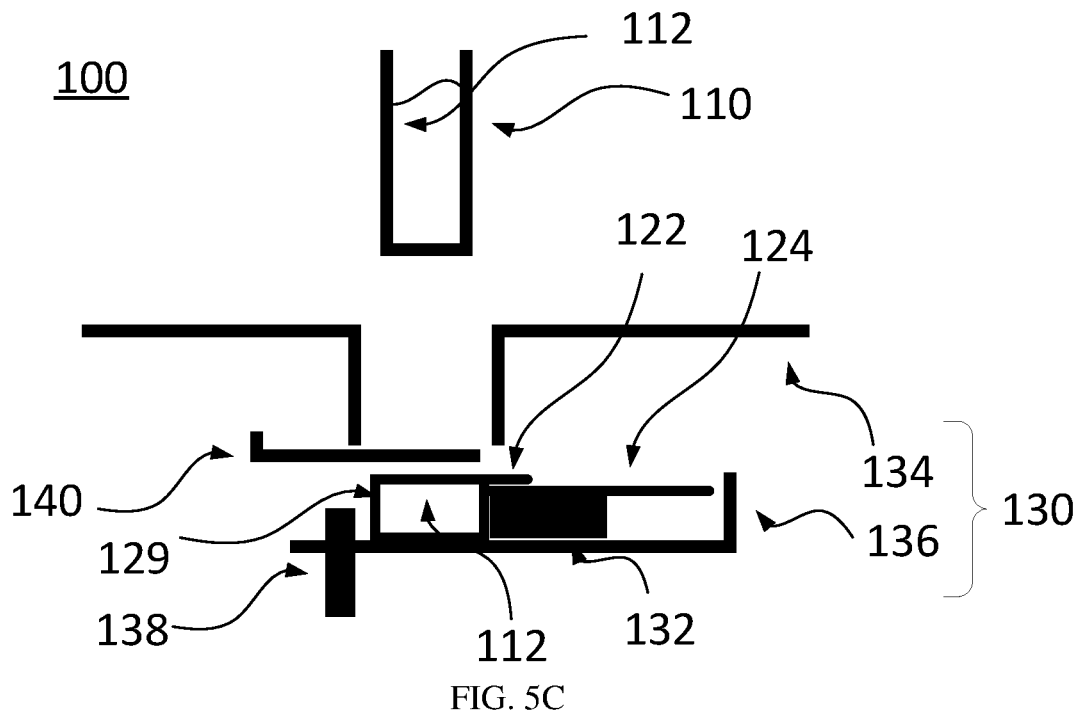

Then, referring to FIG. 5C, the stuffing-filling unit 110 is moved upward. The preliminary wrapping unit 140 is moved toward the right (the second corner 124). At this time, with the assistance of the at least one extruding piece 132, the first corner 122 can be wrapped toward the second corner 124 in a state of maintaining the previous shape to a greater extent. In short, the present invention utilizes the cooperation of the aforesaid components, so that filling the stuffing and wrapping the first corner 122 (at this time, the edible wrapping sheet 120 is in the state of the pre-rolled stuffing food 129) can be completed in the same procedure. It is as if the edible wrapping sheet 120 skips the state of FIG. 6A and directly becomes the state of FIG. 6B.

Figure 5D:
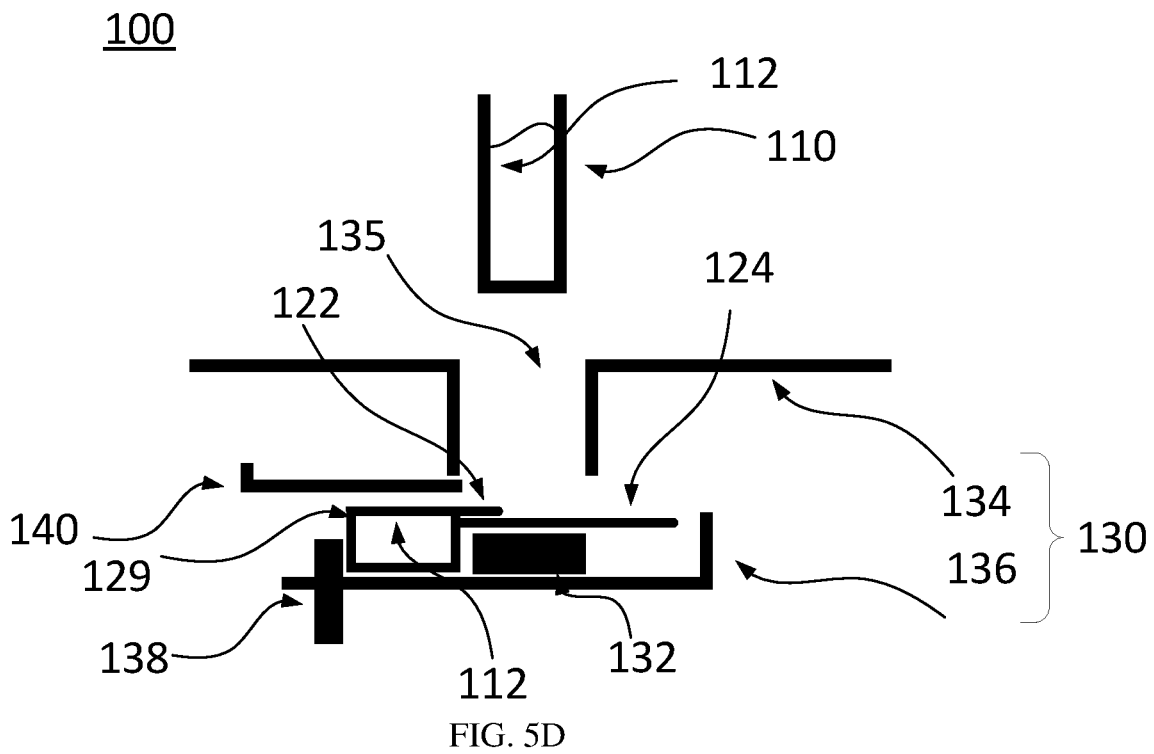

Then, referring to FIG. 5D, the carrier 136 moves the pre-rolled stuffing food 129 to the left, which is moved to the lower right as shown in FIG. 1. The at least one positioning piece 138 can ensure that the pre-rolled stuffing food 129 is moved to the correct position for subsequent operations.

Figure 5E:
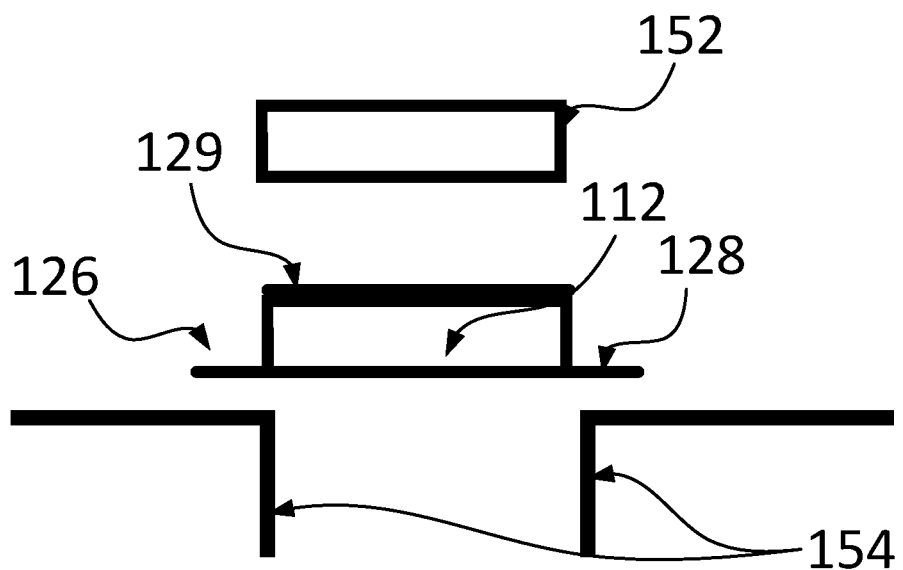
Figure 6B:
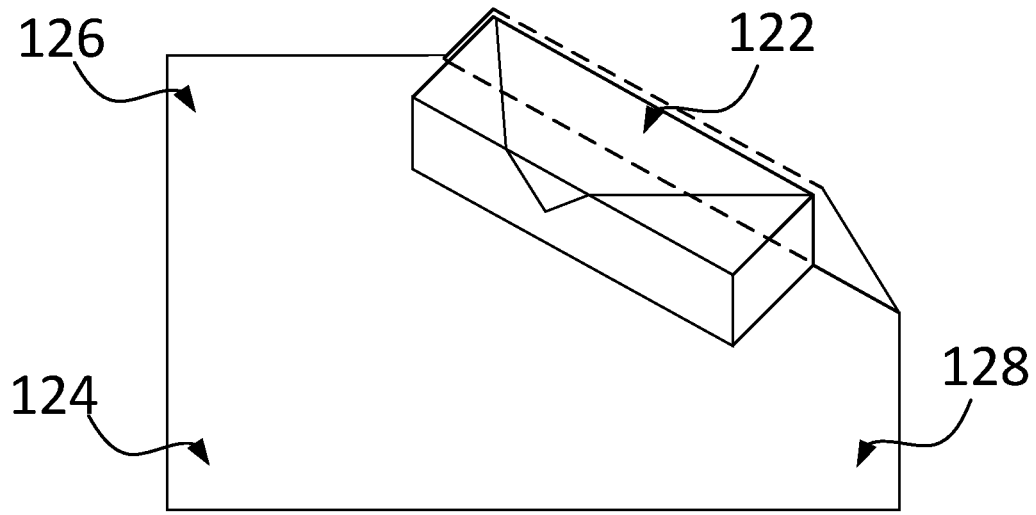
Figure 6C:
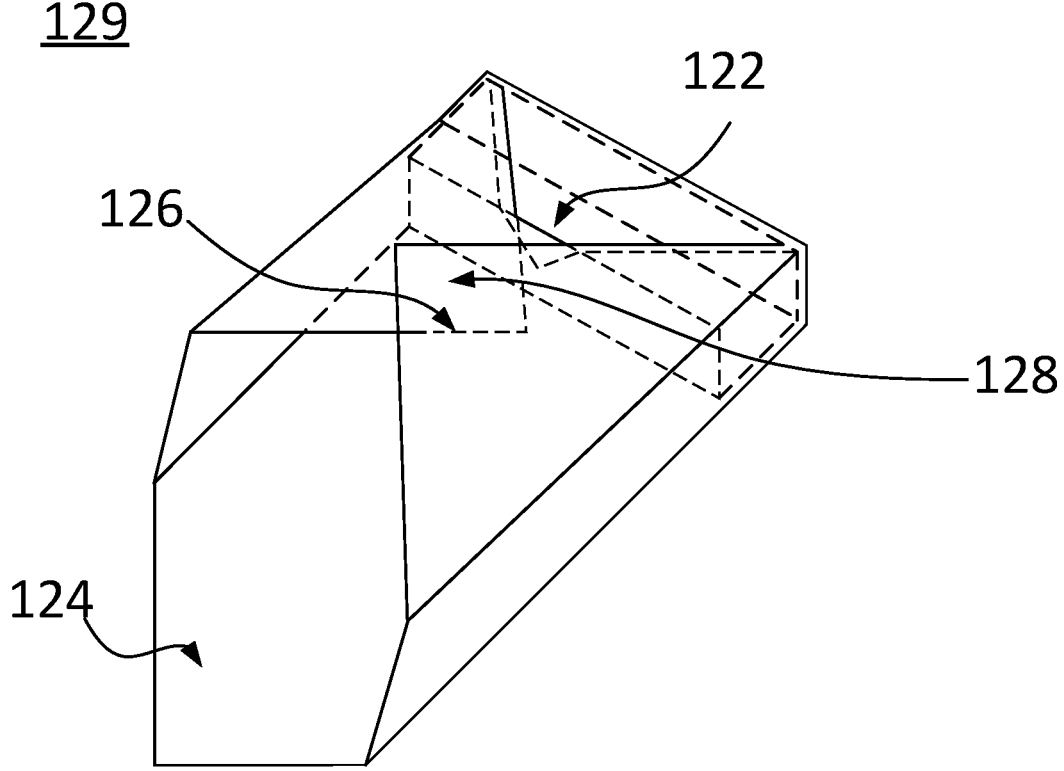

Then, referring to FIG. 5E, this state is just the same as shown in FIG. 6B. As viewing from the direction of the second corner 124, the stuffing 112 inside and the edible wrapping sheet 120 outside can be seen. Then, the down pressing piece 152 will press down the pre-rolled stuffing food 129. The pair of the L shape guiding pieces 154 will naturally wrap the third corner 126 and the fourth corner 128 toward the first diagonal 121. Please refer to FIG. 6C for the accomplished state. The subsequent work will not be repeated, please refer to the aforesaid description.

Specifically, the difference between the stuffing 112 and the pre-rolled stuffing food 129 is whether the first corner 122 has been wrapped on the stuffing 112.

Figure 7:
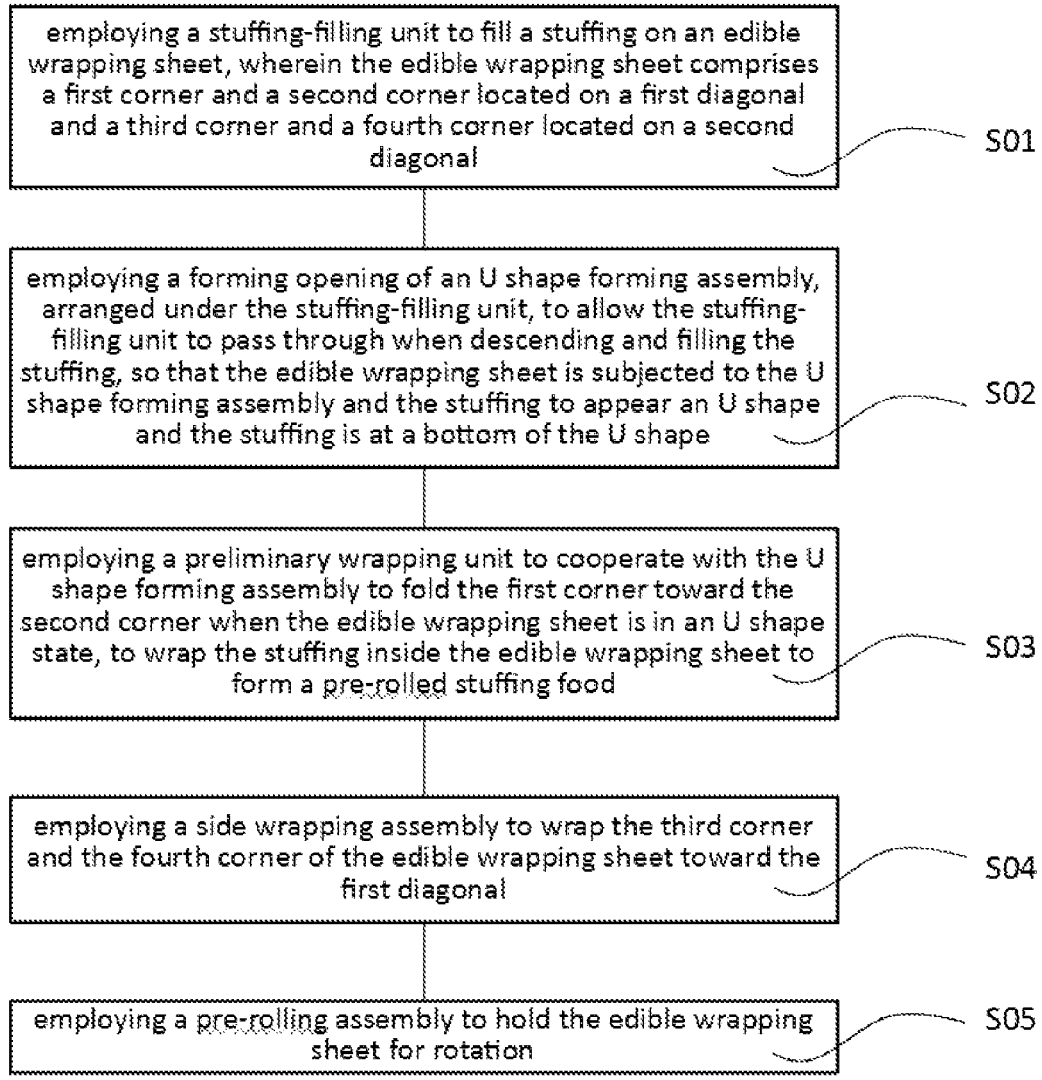
FIG. 7 depicts flowchart showing a rolled stuffing food forming method according to the present invention.

Please refer to FIG. 7, which depicts flowchart showing a rolled stuffing food forming method according to the present invention. Please refer to FIG. 1 to FIG. 6 for component symbols mentioned below, and will not be repeated here. The process is as follows: first, implementing Step S01, employing a stuffing-filling unit 110 to fill a stuffing 112 on an edible wrapping sheet 120, wherein the edible wrapping sheet 120 comprises a first corner 122 and a second corner 124 located on a first diagonal 121 and a third corner 126 and a fourth corner 128 located on a second diagonal 123; then, employing a forming opening 135 of an U shape forming assembly 130, arranged under the stuffing-filling unit 110, to allow the stuffing-filling unit 110 to pass through when descending and filling the stuffing 112, so that the edible wrapping sheet 120 is subjected to the U shape forming assembly 130 and the stuffing 112 to appear an U shape and the stuffing 112 is at a bottom of the U shape; then, implementing Step S02, employing a preliminary wrapping unit 140 to cooperate with the U shape forming assembly 130 to fold the first corner 122 toward the second corner 124 when the edible wrapping sheet 120 is in an U shape state, to wrap the stuffing 112 inside the edible wrapping sheet 120 to form a pre-rolled stuffing food 129; then, implementing Step S04, employing a side wrapping assembly 150 to wrap the third corner 126 and the fourth corner 128 of the edible wrapping sheet 120 toward the first diagonal 121; then, implementing Step S05, employing a pre-rolling assembly 160 to hold the edible wrapping sheet 120 for rotation.

In detail, Step S03 can be: employing the preliminary wrapping unit 140 arranged at a certain height above the carrier 136 to be moved toward the second corner 124 to contact and fold the edible wrapping sheet 120 from the first corner 122 to the second corner 124.

Above are only preferred embodiments of the present invention, and it should be noted that to any persons who are skilled in the art, improvement and modification which is easily derived should be covered by the protected scope of the application. Thus, the protected scope of the application should go by the subject claims, including the improvement and the modification.

COMPONENT SYMBOLS

10: rolled stuffing food forming system
100: rolled stuffing food forming apparatus
110: stuffing-filling unit
112: stuffing
120: edible wrapping sheet
121: first diagonal
122: first corner
123: second diagonal
124: second corner
126: third corner
128: fourth corner
129: pre-rolled stuffing food
130: U shape forming assembly
132: extruding piece
134: guiding assembly
135: forming opening
136: carrier
138: positioning piece
140: preliminary wrapping unit
150: side wrapping assembly
152: down pressing piece
154: L shape guiding piece
160: pre-rolling assembly
162: holding unit
164: rotator
R1: rotating direction

What is claimed is:

1. A rolled stuffing food forming apparatus, comprising:
a stuffing-filling unit, employed to fill a stuffing on an edible wrapping sheet, wherein the edible wrapping sheet comprises a first corner and a second corner located on a first diagonal and a third corner and a fourth corner located on a second diagonal;
an U shape forming assembly, being arranged under the stuffing-filling unit and comprising a forming opening, employed to allow the stuffing-filling unit to pass through when descending and filling the stuffing, so that the edible wrapping sheet is subjected to the U shape forming assembly and the stuffing to appear an U shape and the stuffing is at a bottom of the U shape; and
a preliminary wrapping unit, employed to cooperate with the U shape forming assembly to fold the first corner toward the second corner when the edible wrapping sheet is in an U shape state, to wrap the stuffing inside the edible wrapping sheet to form a pre-rolled stuffing food;
wherein the U shape forming assembly comprises: a guiding assembly, comprising two guiding pieces with the forming opening in between; and a carrier, employed to carry the pre-rolled stuffing food to move toward the first corner after the stuffing-filling unit presses down and fills the stuffing in the edible wrapping sheet;
wherein the preliminary wrapping unit is a folding plate, which is arranged at a certain height above the carrier, and is moved toward the second corner to contact and fold the edible wrapping sheet from the first corner to the second corner.

2. The rolled stuffing food forming apparatus according to claim 1, wherein the carrier further comprises: at least one extruding piece, which is arranged on the carrier and a position thereof is the other side of the preliminary wrapping unit relative to the forming opening; and at least one positioning piece, which is arranged on the carrier and a position thereof is the other side of the at least one extruding piece relative to the forming opening.

3. The rolled stuffing food forming apparatus according to claim 2, further comprising a side wrapping assembly, employed to wrap the third corner and the fourth corner of the edible wrapping sheet toward the first diagonal.

4. The rolled stuffing food forming apparatus according to claim 2, further comprising a pre-rolling assembly, employed to hold the edible wrapping sheet for rotation.

* * * * *